United States Patent
Horibe et al.

(10) Patent No.: US 11,933,638 B2
(45) Date of Patent: Mar. 19, 2024

(54) METHOD FOR DETECTING PHASE ON GEAR, METHOD FOR PRODUCING GEAR, METHOD FOR DETECTING POSITION ON EDGE OF WORKPIECE, AND MACHINE TOOL FOR DETECTING PHASE ON GEAR

(71) Applicant: Yamazaki Mazak Corporation, Niwa-gun (JP)

(72) Inventors: Kazuya Horibe, Niwa-gun (JP); Kazumasa Maruta, Niwa-gun (JP); Hiromasa Yamamoto, Niwa-gun (JP); Yuki Yamamoto, Niwa-gun (JP)

(73) Assignee: YAMAZAKI MAZAK CORPORATION, Aichi (JP)

( * ) Notice: Subject to any disclaimer, the term of this patent is extended or adjusted under 35 U.S.C. 154(b) by 896 days.

(21) Appl. No.: 16/986,271

(22) Filed: Aug. 6, 2020

(65) Prior Publication Data
US 2020/0370923 A1   Nov. 26, 2020

Related U.S. Application Data

(63) Continuation of application No. PCT/JP2018/030093, filed on Aug. 10, 2018.

(51) Int. Cl.
*G01D 5/02* (2006.01)
*G01B 5/24* (2006.01)
*G01D 5/26* (2006.01)

(52) U.S. Cl.
CPC ............ *G01D 5/02* (2013.01); *G01B 5/24* (2013.01); *G01D 5/26* (2013.01)

(58) Field of Classification Search
CPC ... G01D 5/02; G01D 5/26; G01B 5/24; B23Q 17/20; B23F 23/12
See application file for complete search history.

(56) References Cited

U.S. PATENT DOCUMENTS 3,565,532 A * 2/1971 Heitmann ................ G01D 5/34
356/621
3,697,761 A * 10/1972 Kamachi ............ G02B 21/0016
250/208.2

(Continued)

FOREIGN PATENT DOCUMENTS

CH          682853      11/1993
CN       104816046 A    8/2015

(Continued)

OTHER PUBLICATIONS

International Search Report for corresponding International Application No. PCT/JP2018/030093 dated Oct. 30, 2018.

(Continued)

*Primary Examiner* — Octavia Davis Hollington
(74) *Attorney, Agent, or Firm* — MORI & WARD, LLP

(57) ABSTRACT

A method for detecting a phase on a gear includes obtaining a first determination result indicating whether the gear has been detected at a first detection position. A second determination result indicating whether the gear has been detected at a second detection position is obtained. A third angle between the first and second angles is obtained. A third determination result indicating whether the gear has been detected at a third detection position is obtained. The first angle is replaced with the third angle when the third and first determination results are same, or the second angle is replaced with the third angle when the third and first determination results are different. The phase on the gear is detected based on an angle that is between the first angle and the second angle.

20 Claims, 15 Drawing Sheets

(56) References Cited

U.S. PATENT DOCUMENTS

| | | |
|---|---|---|
| 2003/0042441 A1 | 3/2003 | Steketee et al. |
| 2003/0219322 A1 | 11/2003 | Zankl et al. |
| 2010/0023297 A1 | 1/2010 | Kikuchi et al. |
| 2015/0146218 A1 | 5/2015 | Kerscher |
| 2016/0089737 A1 | 3/2016 | Zeller |
| 2017/0144238 A1 | 5/2017 | Ishii |
| 2017/0165803 A1 | 6/2017 | Nakayama |
| 2017/0316568 A1* | 11/2017 | Seitz .................. G06T 7/13 |

FOREIGN PATENT DOCUMENTS

| | | | | |
|---|---|---|---|---|
| CN | 106029273 | | 10/2016 | |
| CN | 104816046 B | | 5/2017 | |
| CN | 107030520 | | 8/2017 | |
| DE | 19501080 | | 7/1996 | |
| DE | 112014006370 T5 | * | 10/2016 | ............ B23Q 17/20 |
| JP | 06-023623 | | 2/1994 | |
| JP | 11-090787 | | 4/1999 | |
| JP | 2004-025333 | | 1/2004 | |
| JP | 2008-110445 | | 5/2008 | |
| JP | 2008188717 A | * | 8/2008 | ............. B23F 23/00 |
| JP | 2009045710 A | * | 3/2009 | |
| JP | 2012232369 A | * | 11/2012 | |
| JP | 2013-129000 | | 7/2013 | |
| JP | 5782864 B2 | * | 9/2015 | |
| JP | 5957872 B2 | * | 7/2016 | |

OTHER PUBLICATIONS

Written Opinion for corresponding International Application No. PCT/JP2018/030093 dated Oct. 30, 2018.

The International Preliminary Report on Patentability (Chapter I) with translation of Written Opinion for corresponding International Application No. PCT/JP2018/030093, dated Feb. 25, 2021.

Chinese Office Action for corresponding CN Application No. 2018800682115, Oct. 20, 2020.

The Extended European Search Report for corresponding EP Application No. 18929486.1 - 1017, Nov. 9, 2020.

* cited by examiner

FIG. 1
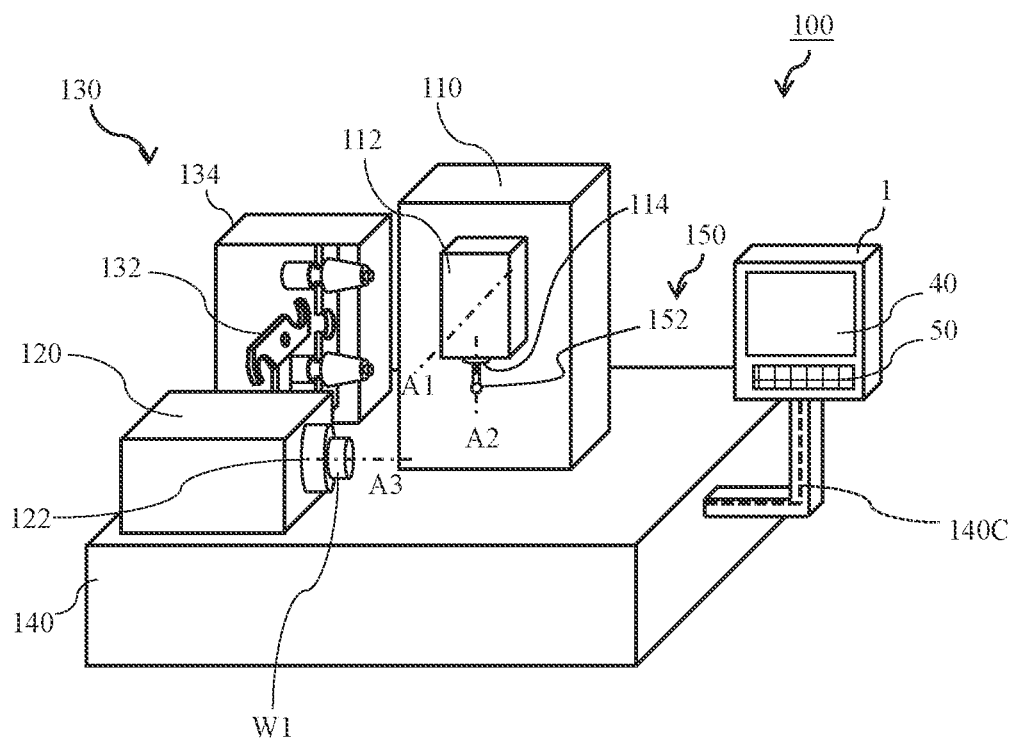
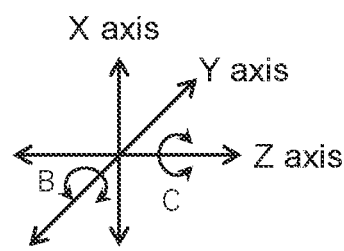

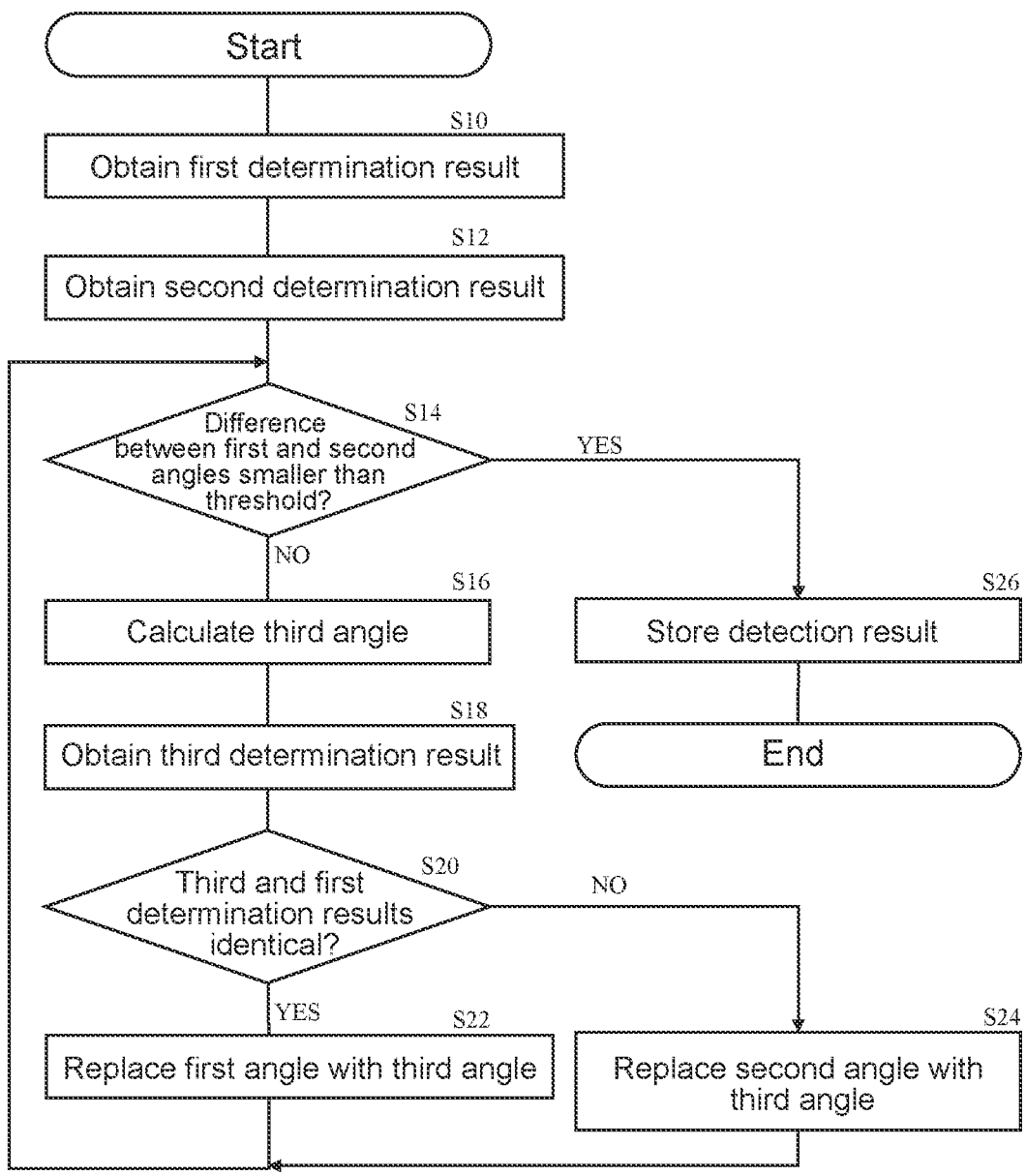

FIG. 8
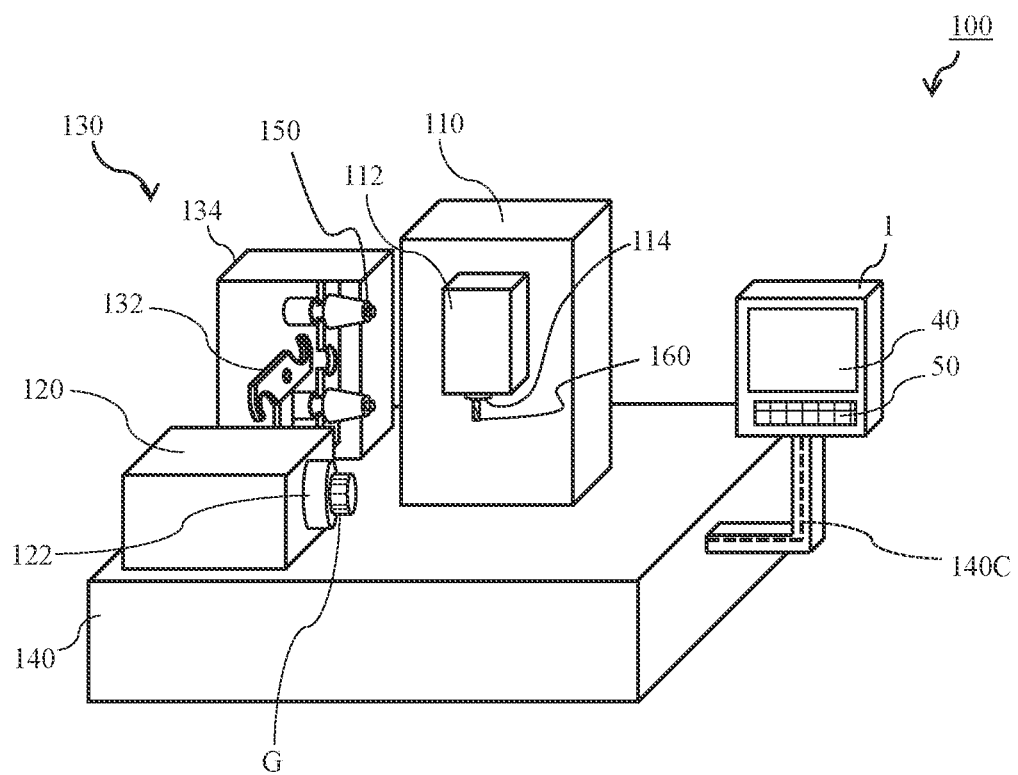
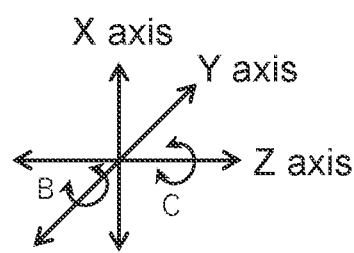

FIG. 12
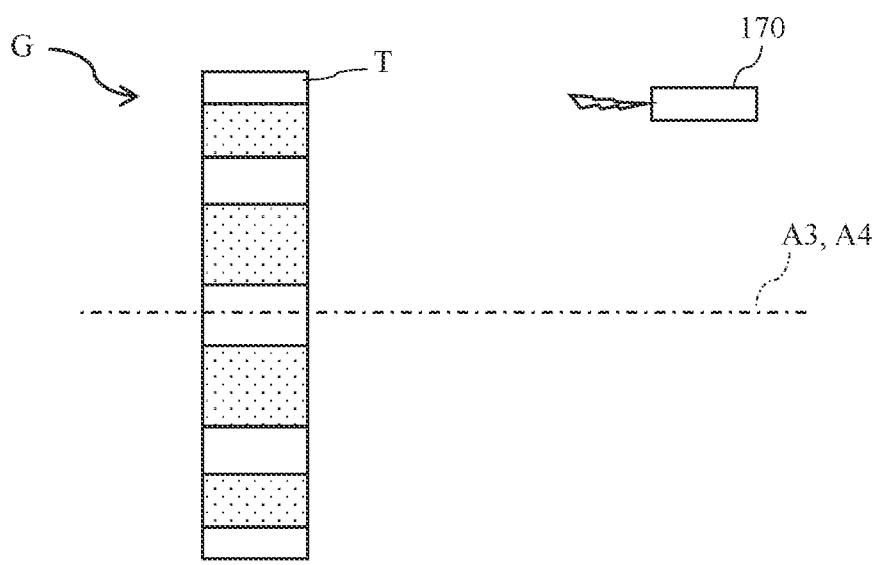
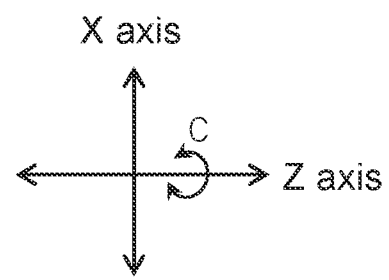

METHOD FOR DETECTING PHASE ON GEAR, METHOD FOR PRODUCING GEAR, METHOD FOR DETECTING POSITION ON EDGE OF WORKPIECE, AND MACHINE TOOL FOR DETECTING PHASE ON GEAR

CROSS-REFERENCE TO RELATED APPLICATIONS

The present application is a continuation application of International Application No. PCT/JP2018/030093, filed Aug. 10, 2018. The contents of this application are incorporated herein by reference in their entirety.

BACKGROUND OF THE INVENTION

Field of the Invention

The present invention relates to a method for detecting a phase on a gear, a method for producing a gear, a method for detecting a position on an edge of a workpiece, and a machine tool for detecting a phase on a gear.

Discussion of the Background

JP 2013-129000A discloses a machining apparatus that detects a phase on the gear held at a spindle that is rotatable about its rotation axis so as to perform post-treatment of the mounted gear.

SUMMARY OF THE INVENTION

According to a first aspect of the present invention, a method for detecting a phase on a gear includes obtaining a first determination result indicating whether the gear has been detected at a first detection position. The first detection position is at a first angle relative to a reference position in a circumferential direction of a rotation axis of a spindle holding the gear. A second determination result is obtained. The second determination result indicates whether the gear has been detected at a second detection position. The second detection position is different from the first determination result and is at a second angle relative to the reference position in the circumferential direction. The second angle is different from the first angle. A third angle that is between the first angle and the second angle is obtained. A third determination result is obtained. The third determination result indicates whether the gear has been detected at a third detection position that is at the third angle relative to the reference position in the circumferential direction. The first angle is replaced with the third angle when the third determination result and the first determination result are same, or the second angle is replaced with the third angle when the third determination result is different from the first determination result. The phase on the gear in the circumferential direction is detected based on an angle that is between the first angle and the second angle.

According to a second aspect of the present invention, a method for producing a gear includes obtaining a first determination result indicating whether the gear has been detected at a first detection position. The first detection position is at a first angle relative to a reference position in a circumferential direction of a rotation axis of a spindle holding the gear. A second determination result is obtained. The second determination result is different from the first determination result and indicates whether the gear has been detected at a second detection position. The second detection position is at a second angle relative to the reference position in the circumferential direction. The second angle is different from the first angle. A third angle that is between the first angle and the second angle is obtained. A third determination result is obtained. The third determination result indicates whether the gear has been detected at a third detection position that is at the third angle relative to the reference position in the circumferential direction. The first angle is replaced with the third angle when the third determination result and the first determination result are same, or the second angle is replaced with the third angle when the third determination result is different from the first determination result. The phase on the gear in the cirumferential direction is detected based on an angle that is between the first angle and the second angle. At least one treatment among finishing on a tooth surface of the gear, burr removal off the gear, copying measurement of the tooth surface, and key hole formation through the gear is performed based on the phase on the gear that has been detected.

According to a third aspect of the present invention, a method for detecting a position on an edge of a workpiece includes obtaining a first determination result indicating whether the workpiece has been detected at a first detection position with the workpiece held at a machine tool. A second determination result is obtained. The second determination result is different from the first determination result and indicates whether the workpiece has been detected at a second detection position different from the first detection position. A third detection position that is between the first detection position and the second detection position is obtained. A third determination result indicating whether the workpiece has been detected at the third detection position is obtained. The third detection position is replaced with the first detection position when the third determination result and the first determination result are same, or the third detection position is replaced with the second detection position when the third determination result is different from the first determination result. One position located between the first detection position and the second detection position is detected as the position on the edge of the workpiece relative to the machine tool.

According to a fourth aspect of the present invention, a machine tool configured to detect a phase on a gear includes a spindle which is configured to hold the gear and which is rotatable about a rotation axis of the spindle; a sensor control circuit configured to determine whether the gear has been detected at a detection position; an angle changer configured to change an angle of the detection position relative to a reference position in a circumferential direction of the rotation axis; and a processor configured to obtain a determination result from the sensor control circuit and control the angle changer. The processor is configured to obtain a first determination result indicating whether the gear has been detected at a first detection position. The first detection position is at a first angle relative to the reference position in the circumferential direction. The processor is configured to obtain a second determination result that indicates whether the gear has been detected at a second detection position and that is different from the first determination result. The second detection position is at a second angle relative to the reference position in the circumferential direction. The second angle is different from the first angle. The processor is configured to obtain a third angle that is between the first angle and the second angle; obtain a third determination result indicating whether the gear has been detected at a third detection position that is at the third angle relative to the reference position in the circumferential direction; replace the first angle with the third angle when the third determination result and the first determination result are same, or the second angle with the third angle when the third determination result is different from the first determination result; and detect the phase on the gear in the circumferential direction based on an angle that is between the first angle and the second angle.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 1 illustrates a schematic configuration of a machine tool according to a first embodiment;

FIG. 4 is a flowchart of operations of the controller for detecting a phase on a gear;

FIG. 8 illustrates a schematic configuration of the machine tool prepared to perform burr removal off the gear;

FIG. 12 illustrates a method for detecting a phase on a gear according to modification 4, which is associated with the method for detecting the phase on the gear illustrated in FIGS. 5A and 5B;

DESCRIPTION OF THE EMBODIMENTS

Figure 2:
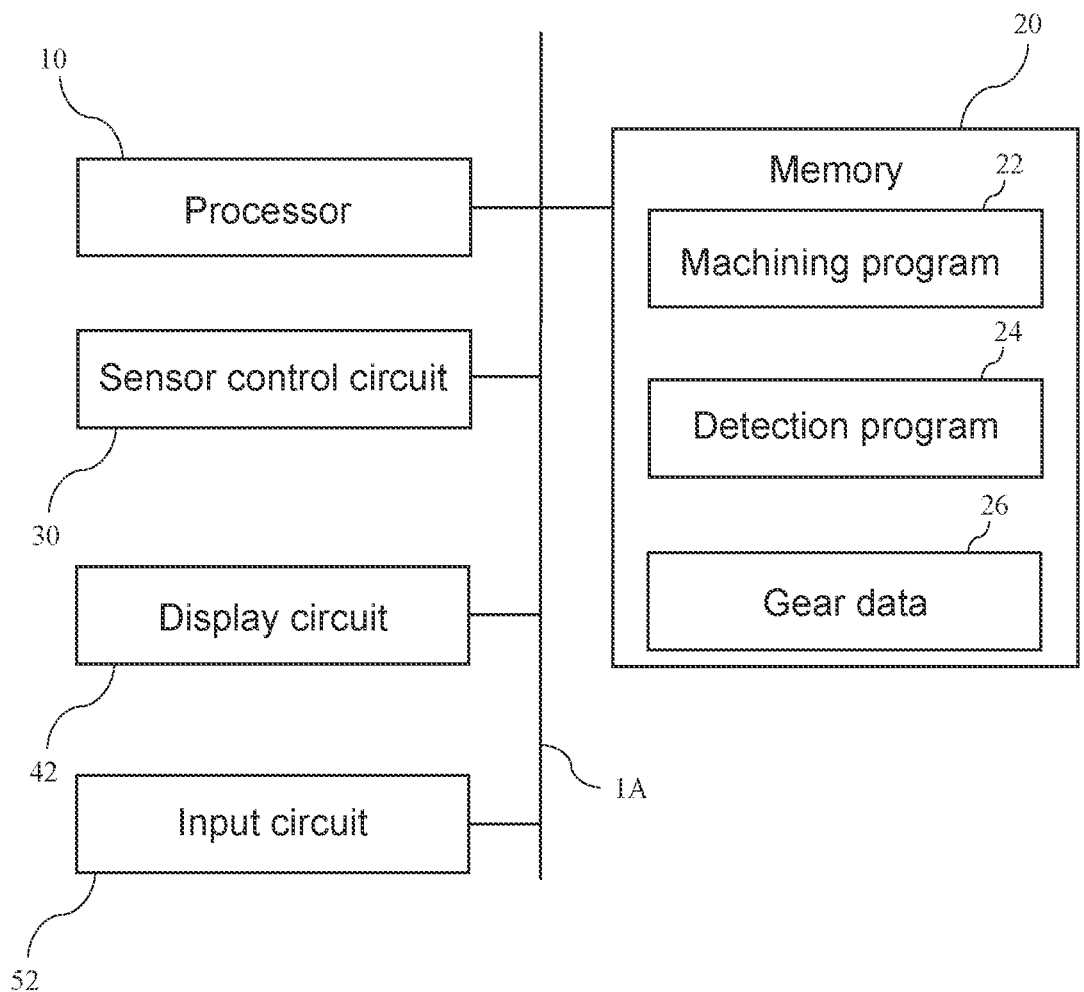
FIG. 2 is a hardware block diagram of a controller.

The embodiments will now be described with reference to the accompanying drawings, wherein like reference numerals designate corresponding or identical elements throughout the various drawings.

First Embodiment

FIG. 1 illustrates a schematic configuration of a machine tool 100 according to the first embodiment. It is to be noted that X axis illustrated in FIG. 1 is parallel to a height direction of the machine tool 100, Y axis is parallel to a depth direction of the machine tool 100, and Z axis is parallel to a width direction of the machine tool 100. B direction corresponds to a circumferential direction of Y axis, and C direction corresponds to a circumferential direction of Z axis.

The machine tool 100 performs pre-treatment of forming a gear by performing gear cutting such as hobbing and gear skiving on a workpiece W1 held at a workpiece spindle 122. Alternatively, another machine tool, which is different from the machine tool 100, is used to form a gear on the workpiece W1, and the gear-formed workpiece W1 is held at the workpiece spindle 122 of the machine tool 100. In this state, in which the workpiece W1 is held at the workpiece spindle 122, the machine tool 100 has no knowledge of the angles at which tooth spaces or teeth are located on the workpiece W1 in the C direction. The C direction corresponds to the circumferential direction of the rotation axis, A3, of the workpiece spindle 122. In other words, the machine tool 100 has no knowledge of C-direction phases on the gear formed on the workpiece W1 relative to the workpiece spindle 122. In light of this, for post-treatment purposes, the machine tool 100 detects a C-direction phase on the gear relative to the workpiece spindle 122. Based on the detected phase on the gear, the machine tool 100 performs post-treatment of burr removal off the teeth and/or finishing treatment on the gear. As illustrated in FIG. 1, the machine tool 100 includes a column 110, a workpiece headstock 120, and a tool exchanger 130. The column 110, the workpiece headstock 120, and the tool exchanger 130 are located on a base 140.

The column 110 is movable in Y axis direction and Z axis direction on the base 140. A tool headstock 112 is mounted on the column 110. The tool headstock 112 is movable in X axis direction relative to the column 110. The tool headstock 112 is turnable in the B direction relative to the column 110. The B direction corresponds to a circumferential direction of rotation axis A1, which is parallel to the Y axis direction. A tool spindle 114 is mounted on the tool headstock 112. The tool spindle 114 is turnable about rotation axis A2 relative to the tool headstock 112. The rotation axis A2 is parallel to the X axis direction.

The workpiece headstock 120 includes the workpiece spindle 122. The workpiece spindle 122 is rotatable in the C direction, which corresponds to a circumferential direction of rotation axis A3. The rotation axis A3 is parallel to the Z axis direction. The workpiece W1 is held at the workpiece spindle 122. The workpiece spindle 122 may hold the workpiece W1 via a chuck or another device.

The tool exchanger 130 exchanges a tool for another tool to be attached to the tool spindle 114. Specifically, the tool exchanger 130 includes a magazine arm 132 and a stocker 134. The magazine arm 132 is rotatable about an axis parallel to the Z axis direction. The magazine arm 132 is movable in the Z axis direction relative to the stocker 134. The stocker 134 contains a plurality of tools in a manner movable in the X axis direction. The plurality of tools contained in the stocker 134 include a cutting tool and a sensor.

The tool exchanger 130 exchanges tools according to the following procedure. The tool headstock 112 moves in the X axis direction and turns in the B direction so that the tool attached to the tool spindle 114 faces the tool exchanger 130. The column 110 moves in the Y axis direction and the Z axis direction to approach the tool exchanger 130, and moves the tool to a tool exchange position. The magazine arm 132 includes: a first gripper at one end in the extending direction in which the magazine arm 132 extends; and a second gripper at the other end in the extending direction. In order to remove the tool attached to the tool spindle 114, the first gripper holds the tool attached to the tool spindle 114. The magazine arm 132 moves away from the tool spindle 114 in the Z axis direction, causing the tool to be removed off the tool spindle 114. In order to attach another tool to the tool spindle 114, the magazine arm 132 rotates about an axis parallel to the Z axis direction, causing the another tool held in the second gripper to be moved to a tool attachment position. The column 110 approaches the tool exchanger 130 in the Z axis direction, causing the another tool to be attached to the tool spindle 114.

The machine tool 100 includes a controller 1. The controller 1 controls the rotations about the rotation axes and the movements in the axis directions. The controller 1 is connected to the base 140. It is to be noted that the controller 1 may be connected to any another position on the machine tool 100, and may even be separate from the base 140 insofar as the controller 1 is capable of transmitting control signals and receiving detection results. The controller 1 is provided with a display 40 and a manipulator 50. The display 40 and the manipulator 50 constitutes a Graphical User Interface. It is to be noted, however, that the display 40 and the manipulator 50 may be separate from the controller 1.

FIG. 2 is a hardware block diagram of the controller 1. As illustrated in FIG. 2, the controller 1 includes a processor 10, a memory 20, a sensor control circuit 30, a display circuit 42, and an input circuit 52. The processor 10, the memory 20, the sensor control circuit 30, the display circuit 42, and the input circuit 52 are connected to each other via a bus 1A. The memory 20 stores programs and data necessary for machining purposes. The processor 10 reads a program stored in the memory 20 and executes the program that has been read. In this manner, the controller 1 implements its functions. The functions implemented by the controller 1 include formation of a gear, detection of a phase on the gear, and post-treatment such as burr removal off the gear, finishing treatment on the gear, and copying measurement of a tooth surface.

Specifically, the memory 20 stores a machining program 22, a detection program 24, and gear data 26. The machining program 22 includes: a control command for formation of a gear; and a control command for burr removal off the gear that has been formed. The detection program 24 includes a control command for detecting the phases on the gear in the C direction of the workpiece spindle 122. The gear data 26 includes parameters of gears to be formed (for example, module, pressure angle, and tooth count). It is to be noted that the programs for the post-treatment on the teeth may be separate from the machining program 22.

The sensor control circuit 30 drives a contact sensor 150, which is mounted on the tool spindle 114. Also, the sensor control circuit 30 analyzes a detection signal output from the contact sensor 150. In this manner, the sensor control circuit 30 detects a contact or non-contact between a contactor 152 of the contact sensor 150 and an object. It is to benoted that the control signal from the controller 1 and the detection signal from the contact sensor 150 are transmitted and received via a cable 140C, which is located between the controller 1 and the base 140.

The display circuit 42 is connected to the display 40 via the cable 140C. The display circuit 42 is controlled by the processor 10 to control content displayed on the display 40.

The input circuit 52 is connected to the manipulator 50 via the cable 140C. Upon input of an operation into the manipulator 50, the input circuit 52 outputs the manipulation as an operation input signal to the processor 10.

Figure 3:
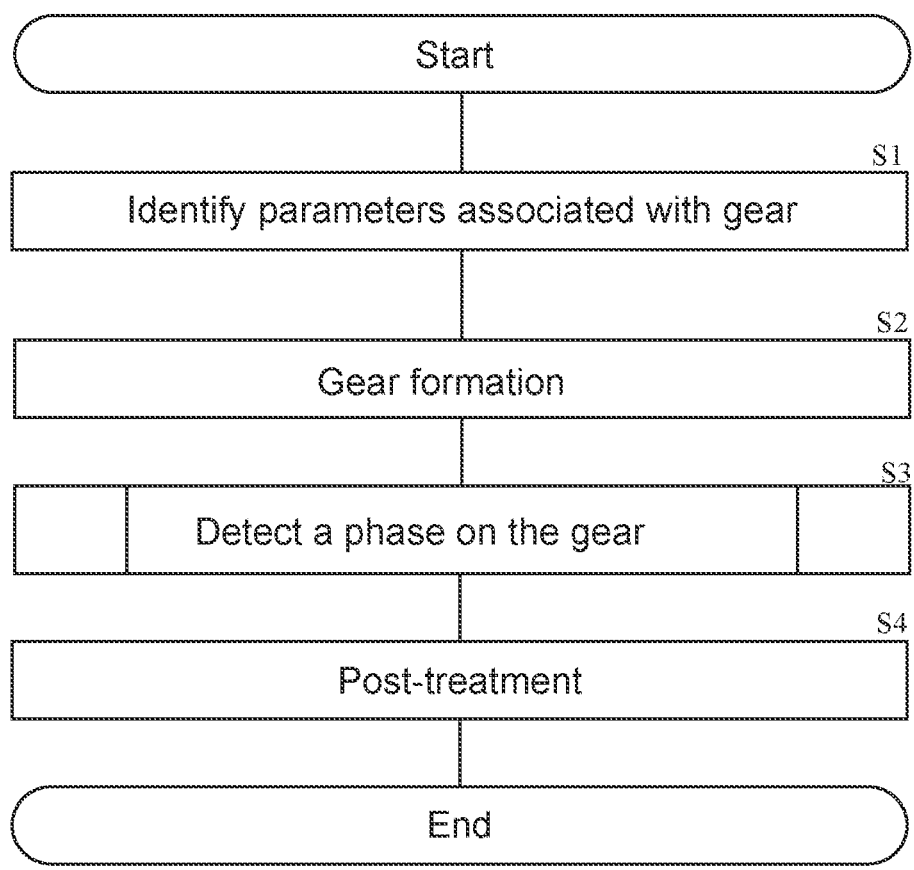
FIG. 3 is a flowchart of operations of the controller.

Next, FIG. 3 is a flowchart of operations of the controller 1. The processor 10 executes the machining program 22 to perform steps 1 and 2. First, the processor 10 identifies parameters associated with the gear (step S1). Specifically, the processor 10 identifies parameters associated with the gear by reading the gear data 26. It is to be noted, however, that parameters associated with the gear may be defined in the machining program 22. It is also to be noted that the processor 10 may identify parameters associated with the gear by obtaining, for example, module, pressure angle, and tooth count if these parameters have been input via the manipulator 50. It is further to be noted that the processor 10 may identify parameters associated with the gear by causing a communication circuit of the controller 1 to receive a setting signal output from another apparatus or device.

Next, the processor 10 performs control for gear formation (step S2). Specifically, in order to attach a hobbing cutter to the tool spindle 114, the processor 10 controls: the movement of the magazine arm 132 in the Z axis direction; the rotation of the magazine arm 132 about its axis parallel to the Z axis direction; the movement of the column 110 in the Z axis direction; and the rotation of the tool headstock 112 about the rotation axis A1. For example, the processor 10 outputs a PWM signal to a stepping motor to move the column 110. Then, the processor 10 causes the workpiece spindle 122 to rotate about the rotation axis A3 and causes the tool spindle 114 to rotate about the rotation axis A2. With the workpiece spindle 122 and the tool spindle 114 rotating, the processor 10 controls the tool headstock 112 to move in the X axis direction and controls the column 110 to move in the Y axis direction and the Z axis direction so that the hobbing cutter contacts the outer surface of the workpiece W1, which has a columnar shape. In this manner, a gear is formed on the workpiece W1. It is to be noted that the gear may be formed by gear skiving.

Upon formation of the gear, the processor 10 executes the detection program 24 to detect a phase on the gear, which is held at the workpiece spindle 122, in the C direction of the workpiece spindle 122 (step S3). The detected phase on the gear is stored in the memory 20 in such a manner that the phase is included in the gear data 26.

Upon detection of the phase on the gear, the processor 10 executes the machining program 22 again to calculate, based on the phase on the gear included in the gear data 26, the angular position of the workpiece spindle 122 in the C direction. Then, the processor 10 performs control for the post-treatment on the gear (step S4).

Figure 5A:
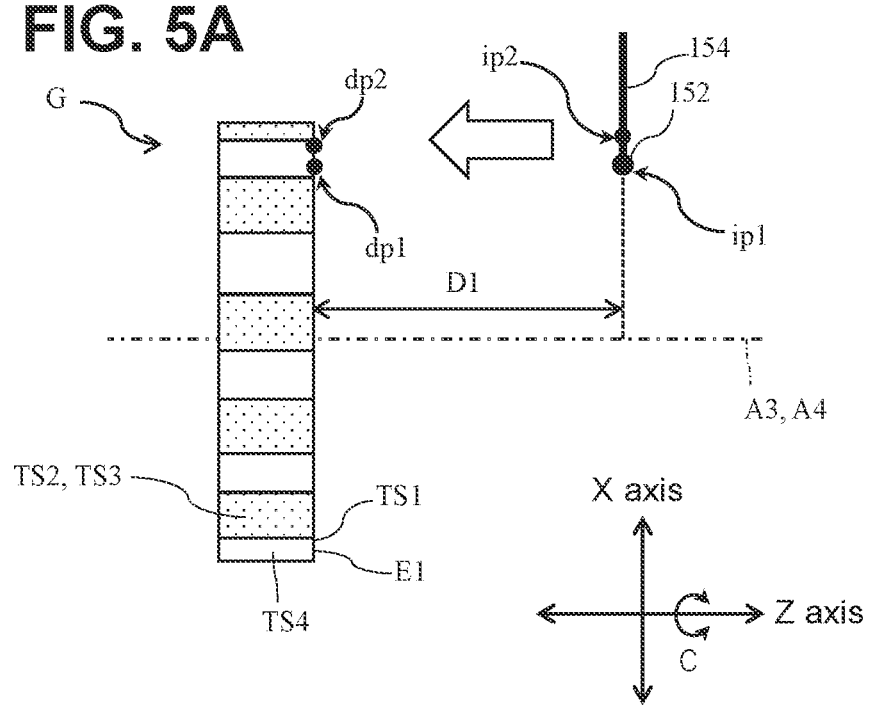
FIG. 5A illustrates a movement of a contactor.
Figure 5B:
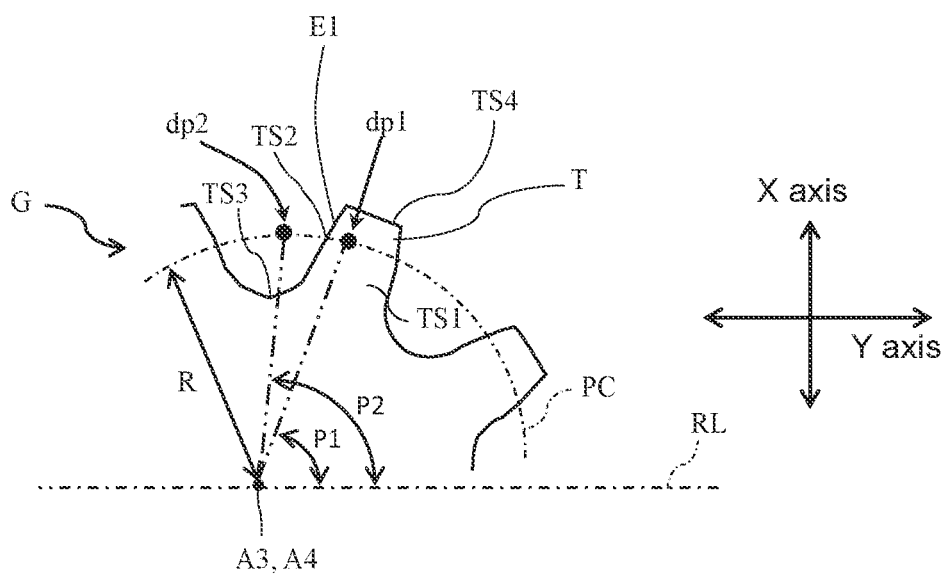
FIG. 5B illustrates a contact between the contactor and the gear.
Figure 6:
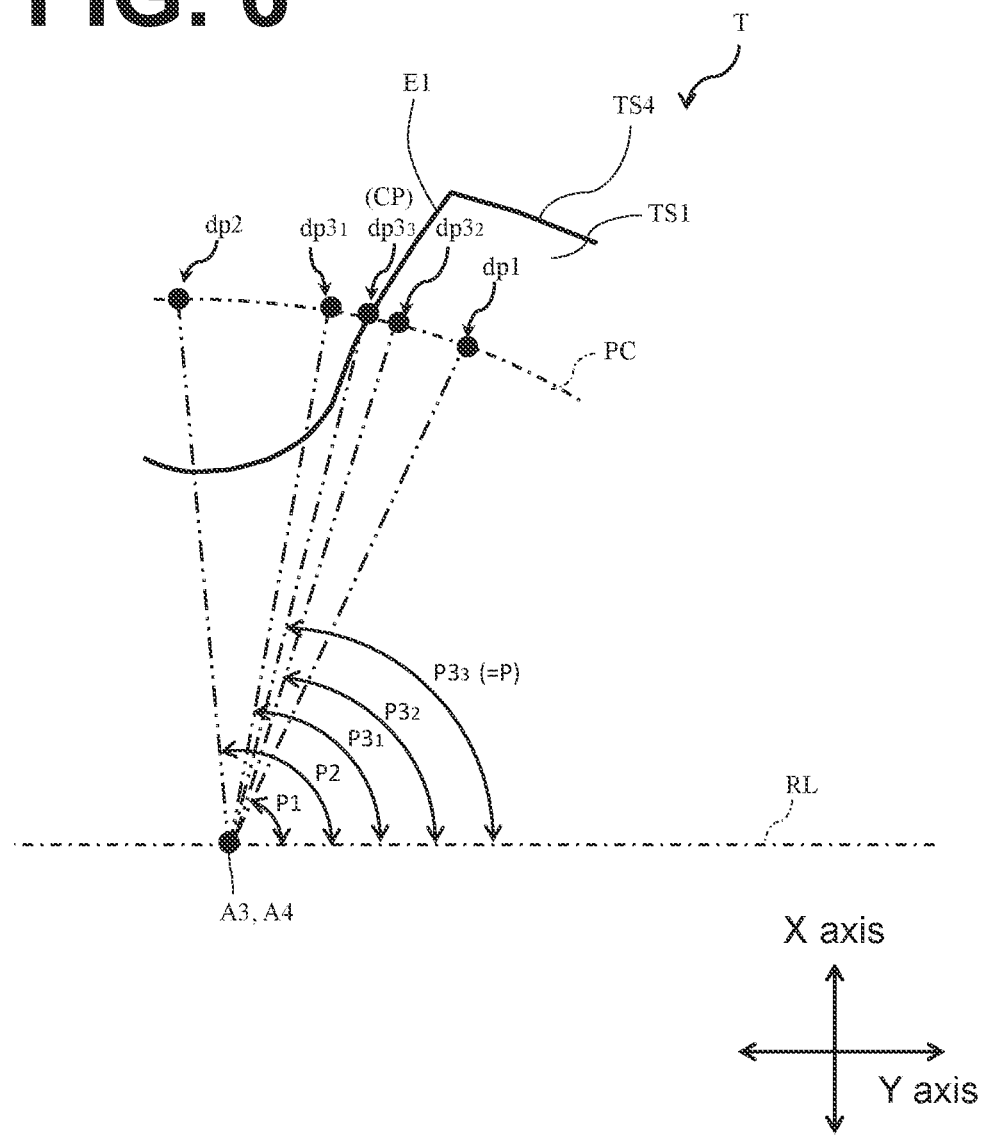
FIG. 6 is a view of an end surface of the gear, illustrating changes in a detection position.

FIG. 4 illustrates, as a sub-process of step S3 illustrated in FIG. 3, a flowchart of operations of the controller 1 for detecting phase P on a gear G. FIG. 5A illustrates a movement of the contactor 152, and FIG. 5B illustrates a contact between the contactor 152 and a tooth T of the gear G. FIG. 6 is a view of an end surface TS1 of the gear G, illustrating changes in a detection position.

First, the phase P on the gear G according to this embodiment will be defined. The phase P on the gear G is defined as an angle formed in the C direction between a reference position RL and any one position on an edge E1 of the gear G. The C direction corresponds to a circumferential direction of rotation axis A4 of the gear G. It is to be noted that the reference position RL is a position in the C direction and illustrated in the form of a line passing through the rotation axis A4. In this embodiment, as illustrated in FIG. 6, any one position on the edge E1 of the gear G is defined as an intersection CP between a pitch circle PC of the gear G and the edge E1. The edge E1 is a boundary between the end surface TS1, which is approximately orthogonal to the rotation axis A4, and a tooth surface TS2, which is approximately parallel to the rotation axis A4. The tooth surface TS2 connects a tooth bottom surface TS3 and a tooth end surface TS4 to each other. It is to be noted that in this embodiment, the gear G is kept in held state by the workpiece spindle 122, and thus the rotation axis A4 of the gear G coincides with the rotation axis A3 of the workpiece spindle 122. This causes the gear G held at the workpiece spindle 122 to rotate in the C direction. It is also to be noted that while the reference position RL is parallel to the Y axis direction in FIGS. 5B and 6, the reference position RL rotates about the rotation axis A4 together with the workpiece spindle 122 when the workpiece spindle 122 rotates about the rotation axis A4, that is, in the C direction.

As illustrated in FIG. 4, the processor 10 obtains a first determination result, according to the detection program 24 (step S10). The first determination result indicates a result that the contactor 152 has contacted the end surface TS1 at a first detection position dp1 or indicates a result that the contactor 152 did not contact the end surface TS1 at the first detection position dp1.

Specifically, as illustrated in FIGS. 5A and 5B, the processor 10 moves the contactor 152 to a first initial position ip1. The first initial position ip1 is away from the end surface TS1 in the Z axis direction by a distance of D1. The first initial position ip1 is away from the rotation axis A4 by a radius of R of the pitch circle PC. The first initial position ip1 and the first detection position dp1 each have a first angle P1 relative to the reference position RL in the C direction. It is to be noted that the distance D1 is calculated based on, for example, the thickness of the workpiece W1 and/or the thickness of the gear G included in the gear data 26 (length in the Z axis direction). In this respect, the position of the tool spindle 114, the position of the workpiece spindle 122, and the position of the contactor 152 are defined in the detection program 24, and by reading the thickness of the gear G from the gear data 26, the distance D1 can be obtained accurately. It is also possible, however, to measure the position of the gear G and then calculate the distance D1. The radius R of the pitch circle PC is calculated based on the diameter of the pitch circle PC read from the gear data 26. In order to position the contactor 152 at the first initial position ip1, the processor 10 controls at least one of: the movement of the column 110 in the Z axis direction and the Y axis direction; the movement of the tool headstock 112 in the X axis direction; the rotation of the tool headstock 112 in the B direction; and the rotation of the workpiece spindle 122 in the C direction.

Then, as illustrated in FIG. 5A, in order to move the contactor 152 in the Z axis direction from the first initial position ip1 to the first detection position dp1, the processor 10 moves the column 110 in the Z axis direction by a total distance of the distance D1 and an additional distance α. When the sensor control circuit 30 has obtained a contact signal from the contactor 152 while the contactor 152 is moving the total distance (D1+α), the first determination result indicates that the contactor 152 has contacted the end surface TS1 at the first detection position dp1. In contrast, when the sensor control circuit 30 obtains no contact signal from the contactor 152 while the contactor 152 is moving the total distance (D1+α), the first determination result indicates that the contactor 152 did not contact the end surface TS1 at the first detection position dp1. As described above, the distance D1 is obtained accurately. This prevents the contactor 152 from falling short of contacting the end surface TS1 due to lack of the distance over which the column 110 moved. The accuracy of the distance D1 also prevents the column 110 from moving too much of a distance and prevents the contactor 152 from being pressed excessively against the end surface TS1. Also, since the distance D1 is obtained accurately, the additional distance α is shortened, resulting in a decrease in time necessary for detection purposes. It is, naturally, not necessary for an operator to manipulate the manipulator 50 to make the contactor 152 closer to the end surface TS1. Upon ending of the movement of the column 110 in the Z axis direction, the processor 10 obtains the first determination result from the sensor control circuit 30.

Next, the processor 10 obtains a second determination result (step S12). Step S12 is different from step S10 in that: the initial position is a second initial position ip2, instead of the first initial position ip1; the detection position is a second detection position dp2, instead of the first detection position dp1; and the second determination result is obtained, instead of the first determination result. Identical operations throughout steps 10 and 12 will not be described here. Specifically, the second initial position ip2 is different from the first initial position ip1 in that the second initial position ip2 has a second angle P2 relative to the reference position RL in the C direction. Similarly, the second detection position dp2 is different from the first detection position dp1 in that the second detection position dp2 has the second angle P2. The processor 10 obtains the second angle P2 by, for example, reading the tooth count included in the gear data 26 and increasing or decreasing the first angle P1 by an angle that is based on the tooth count. For example, when the tooth count is 20, the processor 10 increases or decreases the first angle P1 by 9° (360÷20÷2), and regards the resulting angle as the second angle P2. It is to be noted, however, that this method is not intended as limiting the method of obtaining the second angle P2; the second angle P2 may be any angle that is different from the first angle P1 and that makes the second determination result different from the first determination result. For example, the second angle P2 may be any angle obtained by random numbering. It is possible, however, to obtain the second angle P2 by making the second detection position dp2 larger or smaller than the first detection position dp1 on the pitch circle PC by half a theoretical circular pitch of the gear G. This ensures that the first angle P1 and the second angle P2 are obtained with a single edge E1 located between the first angle P1 and the second angle P2 in the C direction. With the single edge configuration, the phase P at the intersection CP of the edge E1 can be obtained faster. The single edge configuration also prevents such a situation that the range over which the phase is searched for is so narrow that the obtained second angle P2 makes no difference between the second determination result and the first determination result.

The processor 10 moves the column 110 in the Z axis direction to move the contactor 152 by the total distance of the distance D1 and the additional distance α. Then, the processor 10 obtains the second determination result from the sensor control circuit 30. The processor 10 determines whether the obtained second determination result is identical to the first determination result. When the obtained second determination result is identical to the first determination result, the processor 10 changes the second angle P2 to a different second angle P2. Then, using a second initial position ip2 and a second detection position dp2 that correspond to the different second angle P2, the processor 10 obtains a new second determination result. When the new second determination result is different from the first determination result, the processor 10 ends step S12.

Next, the processor 10 determines whether the difference between the first angle P1 and the second angle P2 is smaller than a threshold (step S14). When the difference between the first angle P1 and the second angle P2 is smaller than the threshold (step S14: Yes), the processor 10 causes the memory 20 to store the first angle P1 or the second angle P2 as the phase P on the gear G (step S26). The phase P is stored in the memory 20 in such a manner that the phase P is included in the gear data 26. It is to be noted, however, that the phase P may be any angle between the first angle P1 and the second angle P2, and even may be a middle angle in the middle of the first angle P1 and the second angle P2. It is also to be noted that the phase P may be calculated based on the first angle P1, the second angle P2, and the gear data 26. When the difference between the first angle P1 and the second angle P2 is equal to or higher than the threshold (step S14: No), the processor 10 calculates a third angle P3 (step S16). For example, the processor 10 adds the first angle P1 and the second angle P2 together to obtain a sum, calculates a median value of the sum, and regards the median value as the third angle P3. It is to be noted, however, that the third angle P3 will not be limited to a median value insofar as the third angle P3 is an angle between the first angle P1 and the second angle P2.

Upon calculation of the third angle P3 (step S16), the processor 10 obtains a third determination result (step S18). Specifically, a third initial position ip3 is different from the first initial position ip1 in that the third initial position ip3 has the third angle P3 relative to the reference position RL in the C direction. Similarly, a third detection position dp3 is different from the first detection position dp1 in that the third detection position dp3 has the third angle P3. Then, the processor 10 moves the column 110 by the total distance (D1+α) in the Z axis direction, and obtains the third determination result from the sensor control circuit 30. The third determination result indicates whether the contactor 152 has contacted the end surface TS1 at the third detection position dp3.

Next, the processor 10 determines whether the third determination result is identical to the first determination result (step S20). When the third determination result and the first determination result are identical to each other (step S20: Yes), the processor 10 replaces the first angle P1 with the third angle P3 (step S22). When the third determination result and the first determination result are different from each other (step S20: No), the processor 10 replaces the second angle P2 with the third angle P3 (step S24). After step S22 or step S24, the processor 10 returns to step S14. For example, after the first angle P1 or the second angle P2 has been replaced with the third angle P3, if the difference between the first angle P1 and the second angle P2 is equal to or higher than the threshold (step S14: No), the processor 10 calculates a new third angle P3 again (step S16) and obtains a new third determination result (step S18).

By repeatedly replacing the first angle P1 or the second angle P2 with the third angle P3 and repeatedly obtaining a third determination result, the difference between the first angle P1 and the second angle P2 becomes smaller. This will be described by referring to FIG. 6. It is to be noted that third angle $P3_n$ refers to the third angle P3 calculated for the n-th time in the flowchart illustrated in FIG. 4, and that third detection position $dp3_n$ corresponds to the third angle $P3_n$.

In the example illustrated in FIG. 6, the first determination result indicates that the contactor 152 has contacted the end surface TS1 at the first detection position dp1, which has the first angle P1. The second determination result indicates that the contactor 152 did not contact the end surface TS1 at the second detection position dp2, which has the second angle P2. As illustrated in FIG. 6, the processor 10 calculates third angle $P3_1$, which is between the first angle P1 and the second angle P2. At third detection position $dp3_1$, the contactor 152 does not contact the end surface TS1. That is, the third determination result obtained for the first time is different from the first determination result. Accordingly, the processor 10 replaces the second angle P2 with the third angle $P3_1$. Then, the processor 10 calculates third angle $P3_2$. At third detection position $dp3_2$, the contactor 152 contacts the end surface TS1. That is, the third determination result obtained for the second time is identical to the first determination result. Accordingly, the processor 10 replaces the first angle P1 with the third angle $P3_2$. Then, the processor 10 calculates third angle $P3_3$. Then, the processor 10 obtains a third determination result from the sensor control circuit 30. The third determination result indicates whether the contactor 152 has contacted the end surface TS1 at the third detection position $dp3_3$. By repeating these operations, the difference between the first angle P1 and the second angle P2 becomes smaller. This ensures that the angle, $P3_3$, at the intersection CP of the pitch circle PC and the edge E1 is detected as the phase P on the gear G.

In this embodiment, the contactor 152 moves in a direction (Z axis direction) orthogonal to the end surface TS1 to contact the end surface TS1. This makes it difficult for the contactor 152 to slip on the end surface TS1, resulting in improved detection accuracy. The contact sensor 150 may detect pressure in: a first direction approximately parallel to a support bar 154, which extends between the sensor body and the contactor 152 (see FIG. 5A); and a second direction approximately orthogonal to the support bar 154. In this case, the direction in which the contactor 152 moves may preferably coincide with the first direction or the second direction. If the direction in which the contactor 152 moves (direction toward the end surface TS1) is different from the first direction and the second direction, it is necessary to synthesize the pressure detected in the first direction with the pressure detected in the second direction. In this embodiment, however, the direction in which the contactor 152 moves coincides with the first direction or the second direction. This configuration makes the synthesized value smaller, eliminating or minimizing synthesis-caused detection errors. The above configuration also prevents slippage or a similar movement of the contactor 152 on the measurement surface, which can otherwise be caused if the contactor 152 contacts the measurement surface at an angle. As a result, slippage-caused measurement errors are eliminated or minimized.

Further, the distance D1 between the initial position of the contactor 152 and the end surface TS1 is obtained accurately, as described above. This ensures that once the workpiece W1 is turned into held state, the series of steps on the workpiece W1 are performed without the intervention of the operator, from the pre-treatment to the post-treatment associated with the gear. As a result, the machining time is shortened. Contrarily, conventional practice in detecting the phase on the gear G is to bring the contactor 152 into contact with the tooth surface TS2. With the conventional practice, the position of the tooth surface TS2 and the distance between the initial position of the contactor 152 and the tooth surface TS2 cannot be obtained accurately. Under the circumstances of the conventional practice, in order to bring the contactor 152 into contact with the tooth surface TS2, the operator needs to manipulate the manipulator 50 to make the contactor 152 closer to the end surface TS1. Thus, the conventional practice is time-consuming practice such as having to suspend automatic operation for the purpose of detecting the phase on the gear G in the series of steps from the pre-treatment to the post-treatment associated with the gear, resulting in a longer period of machining time.

Also, as described above, C-direction phases on the gear G held at the workpiece spindle 122 are detected using the contact sensor 150, which is attached to the tool spindle 114. This eliminates the need for a dedicated measuring device or jig for phase detection purposes, facilitating the detection of phases on the gear G and promoting cost reduction at the same time.

Further, the processor 10 adds the first angle P1 and the second angle P2 together to obtain a sum, calculates a median value of the sum, and regards the median value as the third angle P3. With this configuration, C-direction phases on the gear G are detected by rotating the workpiece spindle 122 (or the contactor 152) in the C direction within the ranges of the first angle P1 and the second angle P2. This shortens the measurement time and saves the load that the detection motion has on the machine tool 100.

In the flowchart illustrated in FIG. 4, the phase P detection on the gear G ends at the time when the difference between the first angle P1 and the second angle P2 becomes smaller than the threshold. It is also possible, however, for the processor 10 to end the phase P detection on the gear G at the time when the repetition count of calculation of the third angle P3 exceeds an upper limit.

In the example illustrated in FIG. 6, the detected phase P is the phase at the intersection CP of the edge E1 of the gear G and the pitch circle PC. The edge E1 is an edge on one side of the gear G in the circumferential direction (C direction) of the rotation axis A4. It is also possible, however, to detect the phase at the intersection of the pitch circle PC and the edge on the other side of the gear G in the C direction. For example, the processor 10 obtains the first detection position dp1, at which the contactor 152 contacts the end surface TS1, and obtains a second angle P2 at which the second detection position dp2 is located at a position opposite to the first detection position dp1 in the C direction.

Figure 7A:
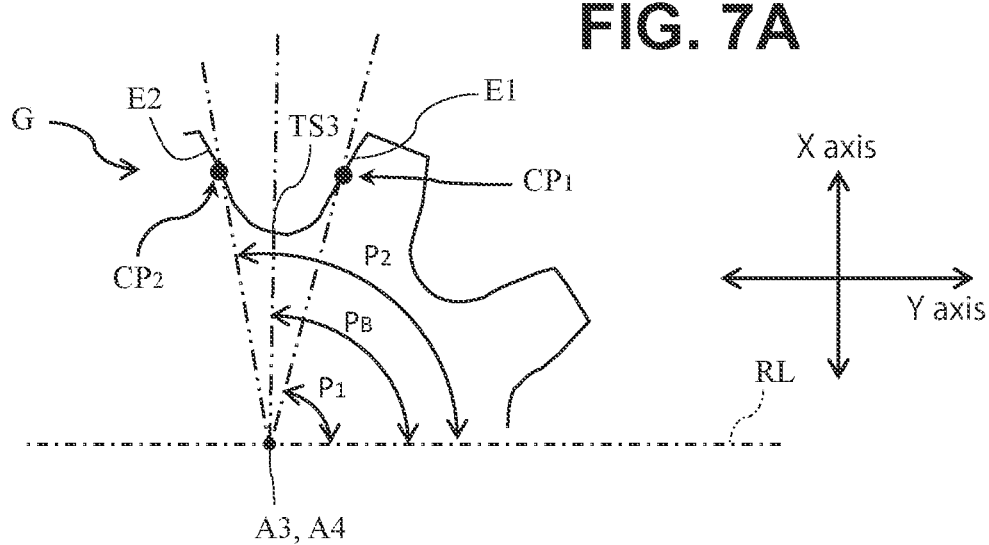
FIG. 7A illustrates a phase on the gear.

In the example illustrated in FIG. 6, the phase P at the intersection CP alone is detected. It is also possible, however, to detect a plurality of phases on the gear by varying the initial value of the first angle P1 (value used at step S10) and repeating the operations illustrated in FIG. 4 using the varied initial values. Also, based on the plurality of phases on the gear that have been detected, it is possible to calculate a phase at a predetermined position on the gear. For example, as illustrated in FIG. 7A, two edges E1 and E2 face each other in the C direction, and there are intersection $CP_1$ of the pitch circle PC and the edge E1; and intersection $CP_2$ of the pitch circle PC and the edge E2. Here, it is possible to: obtain a phase P1 at the intersection $CP_1$; obtain a phase $P_2$ at the intersection $CP_2$; and obtain a phase $P_B$ between the phase $P_1$ and the phase $P_2$ and regard the phase $P_B$ as the phase at the tooth bottom surface TS3. Similarly, it is possible to obtain the phase at the tooth end surface TS4.

Figure 7B:
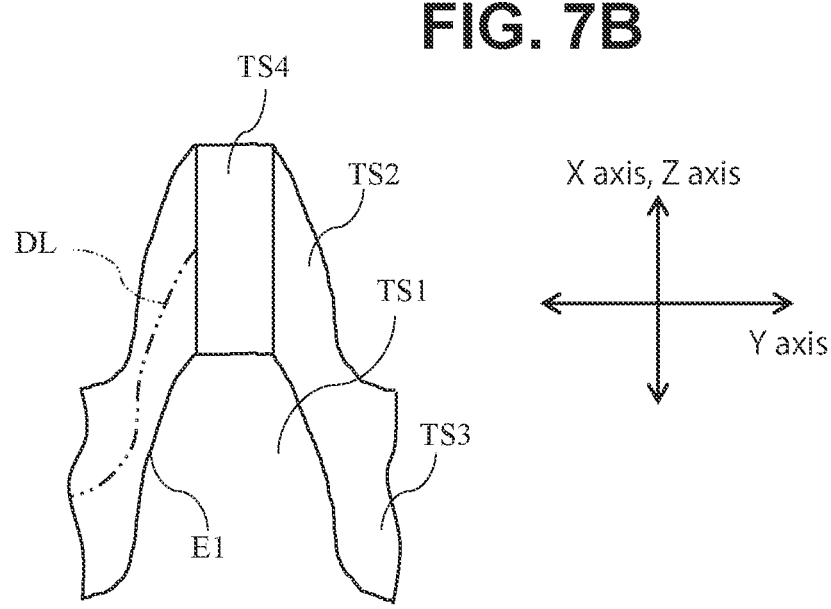
FIG. 7B illustrates a detection example.

Also in the example illustrated in FIG. 6, the phase P at the intersection CP of the pitch circle PC and the edge E1 is detected. This configuration, however, is not intended as limiting the intersection CP; the intersection CP may be at any other position on the edge E1. It is also possible to detect a phase while moving the intersection CP in a radial direction of the rotation axis A4, thereby detecting a line DL as illustrated in FIG. 7B. The line DL connects the tooth bottom surface TS3 and the tooth end surface TS4 to each other and extends along the tooth surface TS2. That is, the radius R of the pitch circle PC is not used as a fixed indicator of the distance between the rotation axis A4 and the detection position in the radial direction of the rotation axis A4. Instead, the distance is varied on a predetermined range basis, and the detection position is calculated based on the varied distances. In this manner, the line DL is detected. It is to be noted, however, that the upper limit of the predetermined range is the distance between the rotation axis A4 and the tooth end surface TS4 in the radial direction of the rotation axis A4, and the lower limit of the predetermined range is the distance between the rotation axis A4 and the tooth bottom surface TS3 in the radial direction of the rotation axis A4.

Thus, the phase P on the gear G is detected. Then, as illustrated in FIG. 8, the processor 10 controls the tool exchanger 130 and associated devices to attach a cutting tool 160, such as an end mill, to the tool spindle 114. The contact sensor 150 is brought into the stocker 134. Then, the processor 10 reads the detected phase P from the gear data 26 and removes burrs off the gear G based on the machining program 22. For example, upon detection of phases at positions on the edge E1, the processor 10, while rotating the tool spindle 114 attached with the cutting tool 160, moves the column 110 and the tool headstock 112 to fit the blade of the cutting tool 160 along the edge E1.

Figure 9:
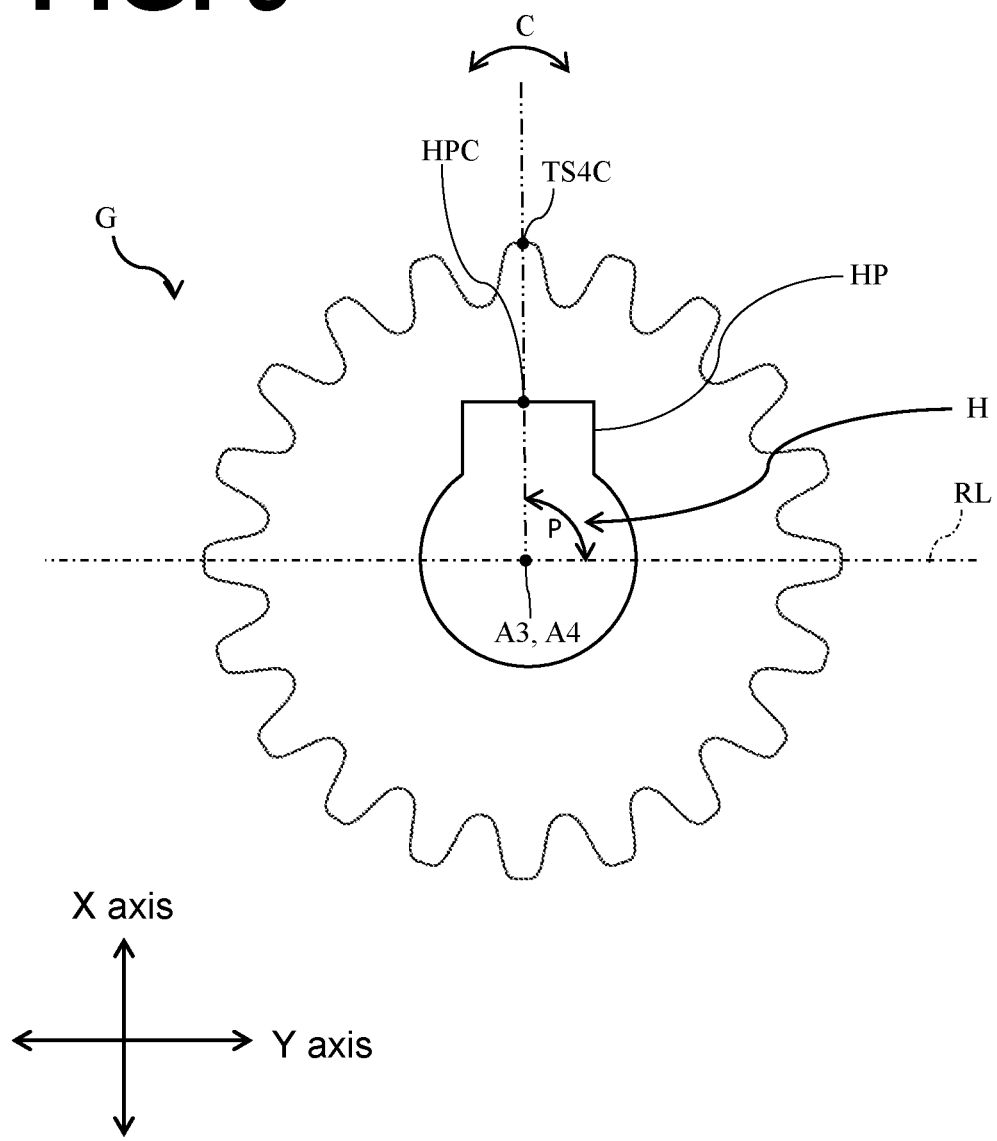
FIG. 9 illustrates formation of a key hole through the gear.

It is to be noted, however, that the post-treatment associated with gear formation will not be limited to the burr removal illustrated in FIG. 8. Another possible example of the post-treatment is formation of a key hole H through the gear G as illustrated in FIG. 9. The shape and position of the key hole H are determined based on the phase P on the gear G. For example, a protrusion HP is formed on the key hole H in such a manner that the phase P is common in the C direction to a center position HPC of the protrusion HP and a center position TS4C of the tooth end surface TS4 of the tooth T. Still another possible example of the post-treatment is punching at a predetermined position relative to the phase P on the gear G. Still other possible examples of the post-treatment include finishing treatment on the tooth surface TS2 and copying measurement of the tooth surface TS2.

It is also to be noted that insofar as the contactor 152 and the gear G move relative to each other, the processor 10 may move the workpiece headstock 120 in the Z axis direction with the position of the contactor 152 fixed in the Z axis direction, and obtain a determination result associated with contact between the contactor 152 and the gear G.

Figure 10A:
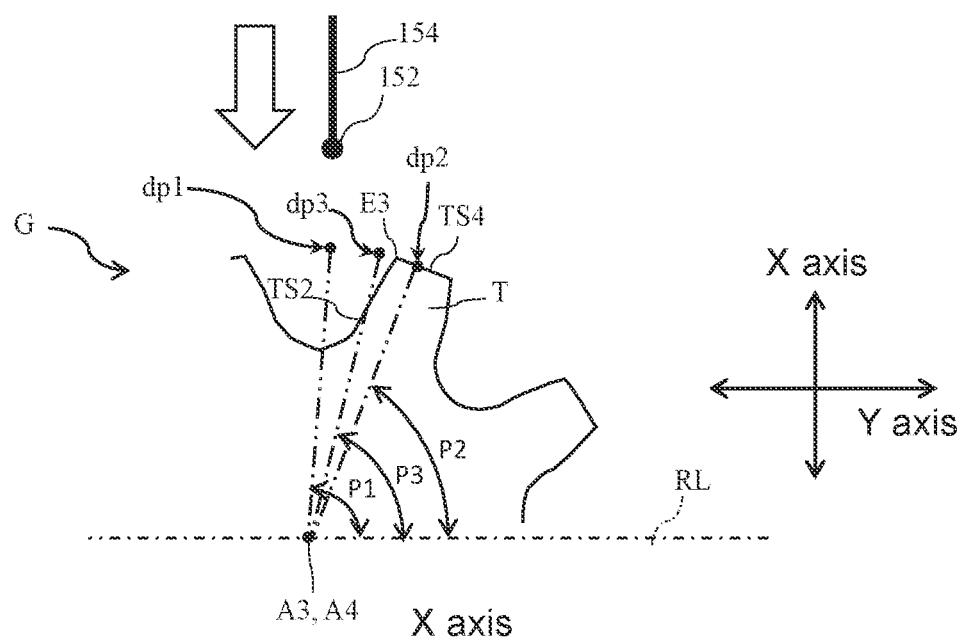
FIGS. 10A and 10B illustrate a method for detecting a phase on a gear according to modification 1, which is associated with the method for detecting the phase on the gear illustrated in FIGS. 5A and 5B.
Figure 10B:
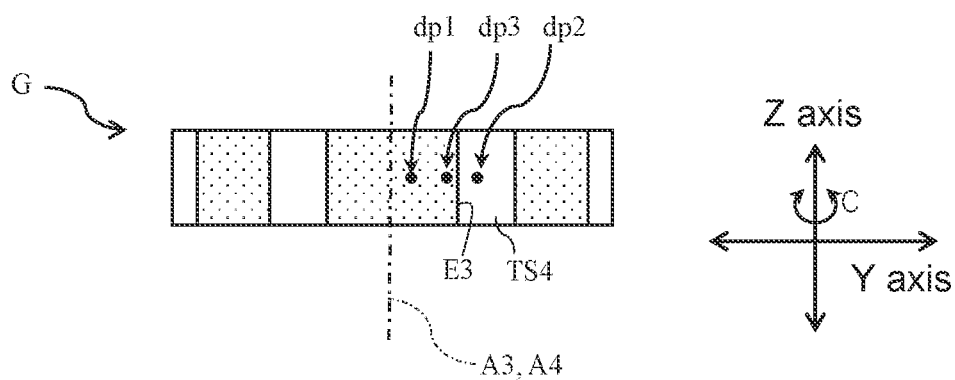

Next, FIGS. 10A and 10B illustrate a method for detecting a phase on a gear according to modification 1, which is associated with the method for detecting the phase on the gear illustrated in FIGS. 5A and 5B. In the example illustrated in FIGS. 5A and 5B, the phase P is detected by bringing the contactor 152 into contact with the end surface TS1 of the tooth T. In contrast, in the method according to modification 1, the phase P is obtained by bringing the contactor 152 into contact with the tooth end surface TS4. As illustrated in FIG. 10A, in the method according to modification 1, the contactor 152 is moved in the X axis direction. The distance over which the contactor 152 moves in the X axis direction is set based on tooth end surface diameter included in the gear data 26. Then, the controller 1 determines whether the contactor 152 has contacted the tooth end surface TS4 at the third detection position dp3. The third detection position dp3 has the third angle P3, which is between the first angle P1 of the first detection position dp1 and the second angle P2 of the second detection position dp2. In this manner, in the method according to modification 1, a phase at any position on an edge E3 of the tooth surface TS2 and the tooth end surface TS4 is obtained as the phase P on the gear G.

It is to be noted, however, that in the example illustrated in FIGS. 10A and 10B, the direction in which the contactor 152 moves will not be limited to the X axis direction. The processor 10 may control the movement of the column 110, the rotation of the workpiece spindle 122, the movement of the tool headstock 112, and the rotation of the tool spindle 114 to move the contactor 152 in a direction orthogonal to the tooth end surface TS4. In any of the above cases, the distance over which the contactor 152 moves is obtained accurately by reading the tooth end surface diameter from the gear data 26.

In the above-described example, the angle of the detection position is changed by moving the contactor 152, instead of rotating the gear G. It is also possible, however, to change the angle of the detection position by rotating the workpiece spindle 122 with the position of the contactor 152 fixed. In this case, the detection is made possible only by moving the contactor 152 in the Z axis direction, resulting in improved detection accuracy.

In the above-described example, phases on a spur gear G are detected. The above-described method for detecting the phase on the gear, however, can also be applied to other gears such as spiral gears and bevel gears and to spline shafts.

Figure 11A:
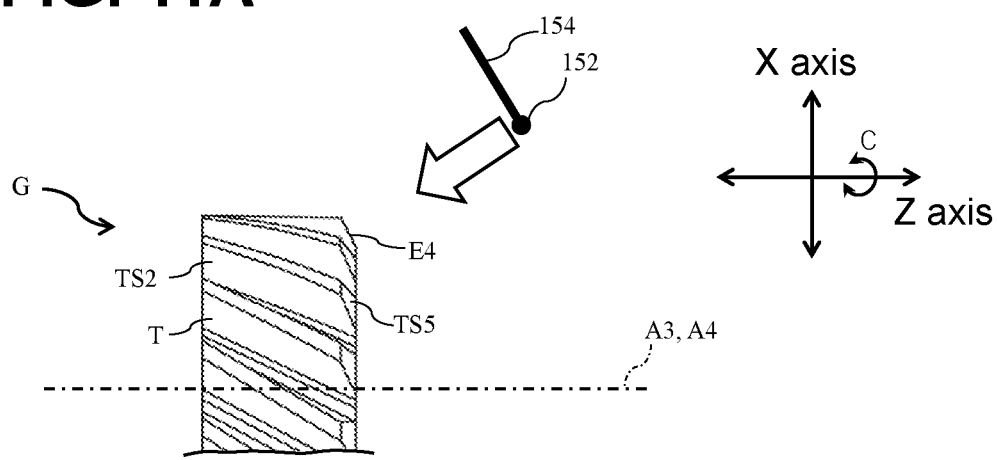
FIG. 11A illustrates a method for detecting a phase on a gear according to modification 2, which is associated with the method for detecting the phase on the gear illustrated in FIGS. 5A and 5B.

Next, FIG. 11A illustrates a method for detecting a phase on a gear according to modification 2, which is associated with the method illustrated in FIGS. 5A and 5B for detecting the phase on the gear held at the spindle of the machine tool. In the method according to modification 2, a phase at any position on edge E4 of a tapered surface TS5 of the tooth T and the tooth surface TS2 is detected as the phase P on the gear G. It is assumed that shape data of the tapered surface TS5 (for example, inclination angle relative to the end surface TS1) is included in the gear data 26. In the example illustrated in FIG. 11A as well, it is preferable to move the contactor 152 in a direction orthogonal to the tapered surface TS5 to bring the contactor 152 into contact with the tapered surface TS5. Further, as illustrated in FIG. 11A, it is preferable to bring the contactor 152 into contact with the tapered surface TS5 in a second direction orthogonal to a first direction in which the support bar 154 extends. This makes it difficult for the contactor 152 to slip on the tapered surface TS5.

Figure 11B:
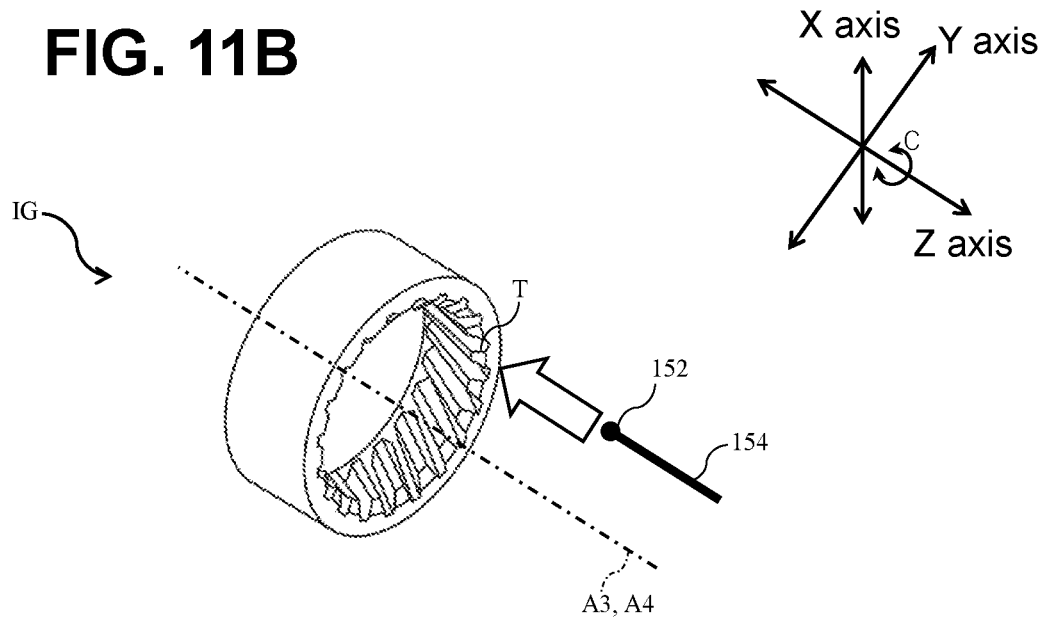
FIG. 11B illustrates a method for detecting a phase on a gear according to modification 3, which is associated with the method for detecting the phase on the gear illustrated in FIGS. 5A and 5B.

Also in the above-described example, the teeth T are provided on the outer surface of the gear G. The above-described method for detecting the phase on the gear, however, can also be applied to an internally-toothed gear IG, which has teeth on its inner surface, as in the method illustrated in FIG. 11B for detecting a phase on a gear according to modification 3. As illustrated in FIG. 11B, it is preferable to bring the contactor 152 into contact with the tooth T in a first direction in which the support bar 154 extends. This makes it difficult for the support bar 154 to contact the internally-toothed gear IG.

Next, FIG. 12 illustrates a method for detecting a phase on a gear held at a spindle of a machine tool according to modification 4, which is associated with the method for detecting the phase on the gear illustrated in FIGS. 5A and 5B. In the above-described example, a detection is made as to whether the contactor 152 has contacted the tooth T of the gear G at the detection position. In the method illustrated in FIG. 12 for detecting the phase on the gear according to modification 4, a laser determination sensor 170 is used to detect whether the tooth T is at the detection position.

The laser determination sensor 170 includes: a light emitting element that radiates laser light; and a light receiving element. Laser light from the laser determination sensor 170 is reflected on the tooth T, and the laser determination sensor 170 detects, based on reflection light of the laser light, whether the tooth T is at the detection position. It is to be noted, however, that the laser determination sensor 170 will not be limited to a reflection-type laser sensor; it is also possible to use a transmission-type laser sensor. Also, it is also possible to use a proximity sensor (that detects capacitance or magnetic metal), instead of the laser determination sensor 170.

Figure 13:
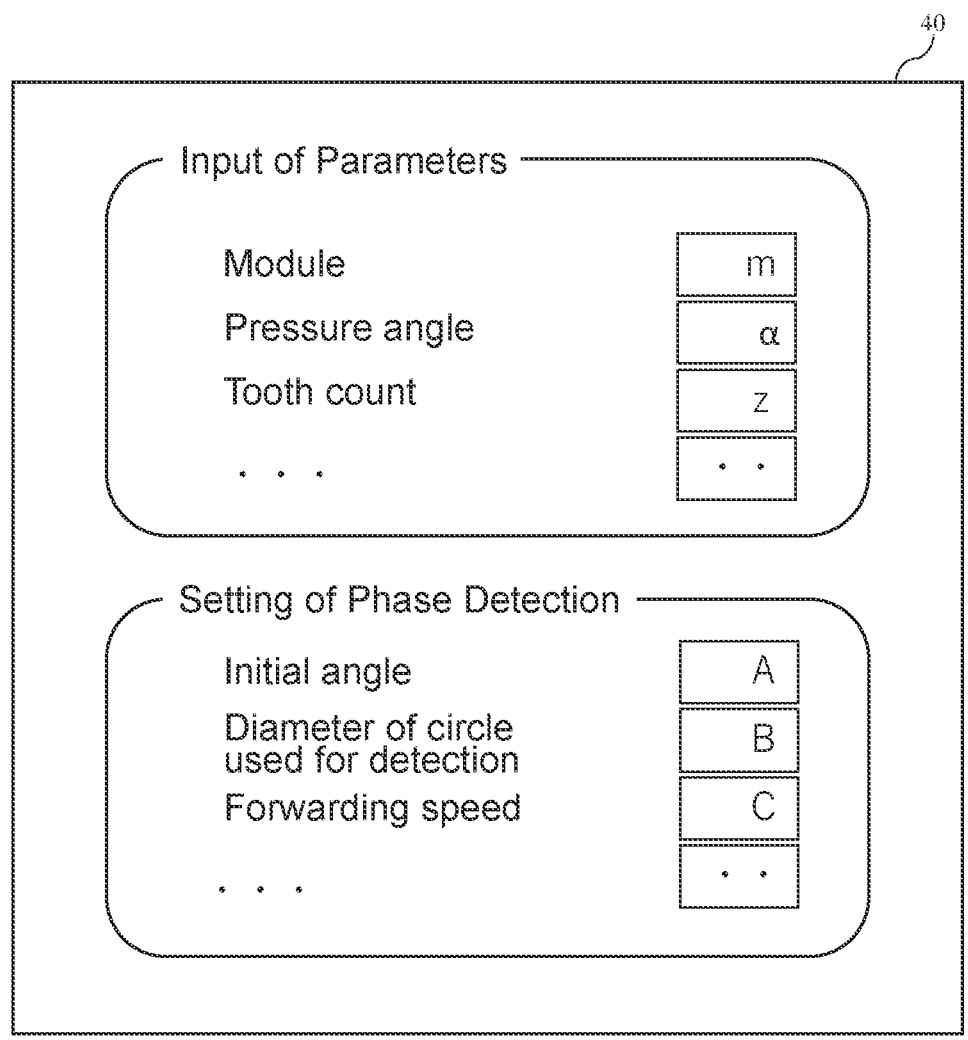
FIG. 13 illustrates an example input screen for detection of a phase on the gear.

Next, an example display content implemented by the detection program 24 will be described by referring to FIGS. 13 and 14. FIG. 13 illustrates an example input screen on which to input information necessary for the detection of a phase on the gear G held at the workpiece spindle 122. The display content is displayed by the display circuit 42 on the display 40 under the control of the processor 10. Upon receipt of an operation on the manipulator 50, an operation input is input into the input circuit 52. Specifically, as illustrated in FIG. 13, the operator inputs, via the manipulator 50, information necessary for detection of a phase on the gear G held at the workpiece spindle 122. The necessary includes: the gear data 26, which includes parameters associated with the gear G; the diameter of a circle used for detection purposes (for example, the diameter of a circle crossing an edge of the gear at the phase to be detected); the forwarding speed of the contactor 152; and posture (for example, in the direction in which the support bar 154 extends relative to the forwarding direction). As used herein, the term initial angle refers to the first angle P1 of the first detection position dp1 (see FIG. 5B). Based on the information that has been input, the processor 10 determines the first detection position dp1 and the second detection position dp2. The display circuit 42 may display on the display 40 the determined first detection position dp1 and the determined second detection position dp2. The display circuit 42 may also make the determined first detection position dp1 and the determined second detection position dp2 changeable at the operator's manipulation. Thus, by the mere operation of inputting necessary information, the operator is able to readily adjust the conditions for executing the detection program 24 based on specifications of the gear G and the contact sensor 150.

Also, the display 40 displays the gear G so that a position on any of the plurality of edges of the plurality of tooth of the gear G is input into the input circuit 52 via the manipulator 50. Upon input of the position, the processor 10 may control the column 110, the tool headstock 112, the workpiece spindle 122, and the tool exchanger 130 to detect the phase of the position that has been input.

Figure 14:
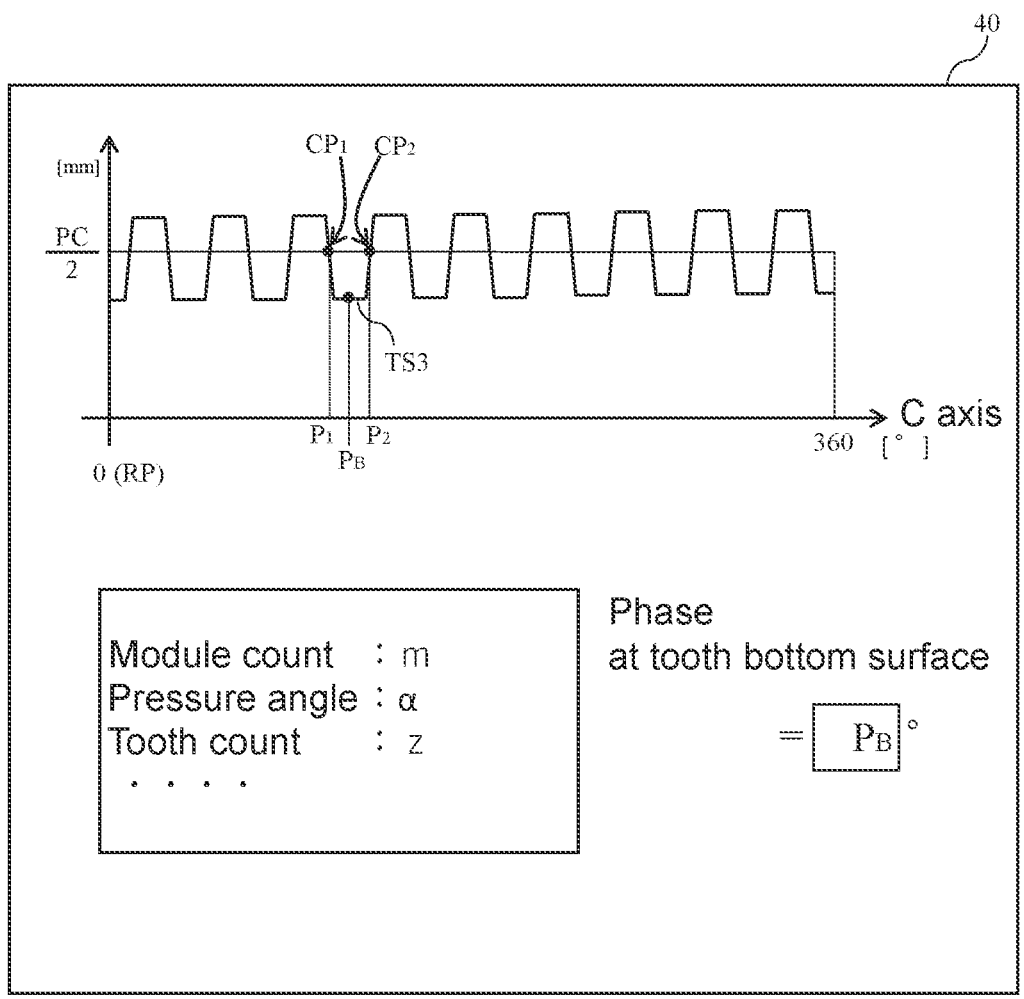
FIG. 14 illustrates an example of how a result of the detected phase on the gear is displayed.

Next, FIG. 14 illustrates an example of how a result of the detected phase on the gear G is displayed. Before performing the post-treatment according to the machining program 22, the processor 10 may display the detected phase on the gear G on the display 40 according to the machining program 22 or the detection program 24. For example, the example display content of FIG. 14 corresponds to the detection result of the phase illustrated in FIG. 7A, and includes a graph with the length of the rotation axis A4 in the radial direction on the vertical axis (mm) and with C axis on the horizontal axis (°). The graph includes the phase $P_1$ at the intersection $CP_1$, the phase $P_2$ at the intersection $CP_2$, and the phase $P_B$ (the phase at the tooth bottom surface TS3), which is between the phase $P_1$ and the phase $P_2$. It is to be noted that the C axis is equivalent to the C direction developed into a linear axis for graph indication purposes, the C direction being the circumferential direction of the rotation axis A4. Further in the example display content of FIG. 14, the display 40 displays, in text form, parameters of the gear G and the phase $P_B$ at the tooth bottom surface TS3.

It is to be noted that the processor 10, the contact sensor 150 (or the laser determination sensor 170), and the sensor control circuit 30 correspond to the determining means for determining whether the gear G has been detected at the detection position. It is also to be noted that the column 110 and the tool headstock 112 (or the workpiece spindle 122) correspond to the angle changer. It is also to be noted that the processor 10 corresponds to the controlling means for obtaining a determination result from the determining means and for controlling the angle changing means. It is also to be noted that the manipulator 50 and the input circuit 52 correspond to the inputting means for receiving an input of information including parameters of the gear G. It is also to be noted that the display 40 and the display circuit 42 correspond to the displaying means for displaying the detected phase on the gear G in the C direction, which corresponds to the circumferential direction of the rotation axis A4.

Second Embodiment

Figure 15:
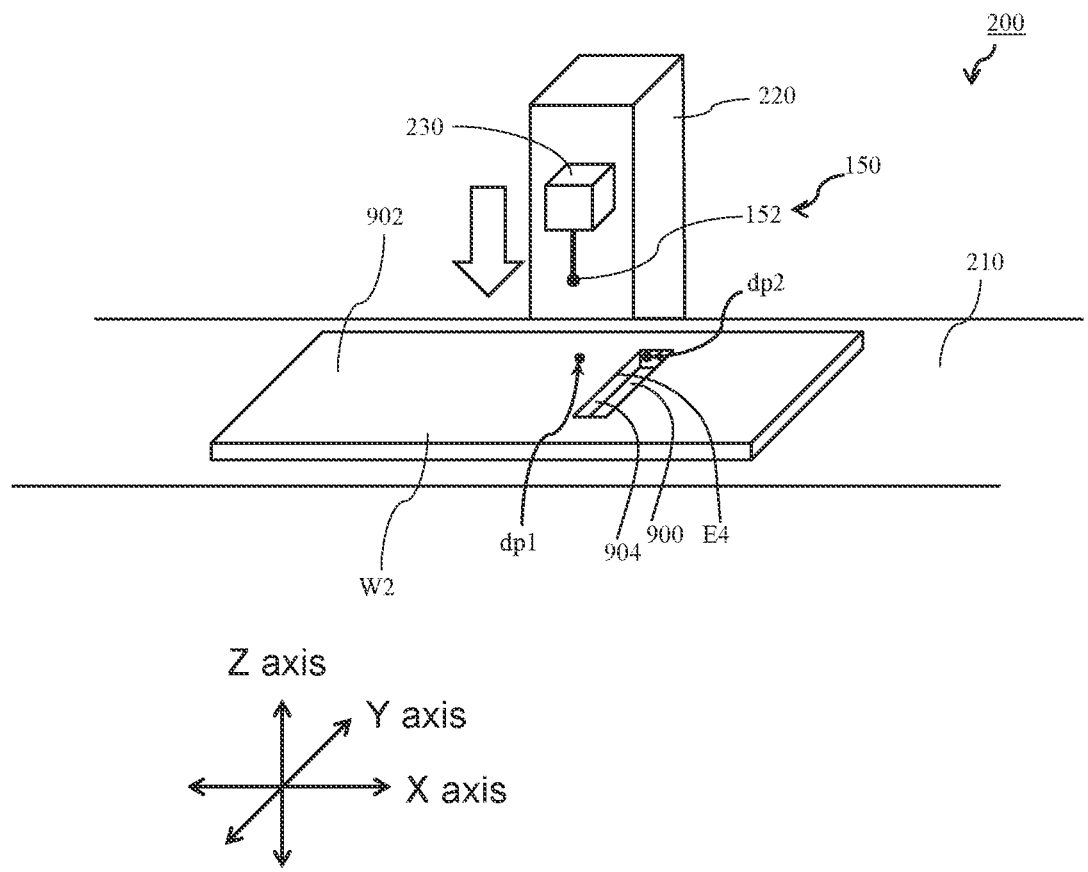
FIG. 15 illustrates a schematic configuration of a machine tool according to a second embodiment that detects a position on an edge of a workpiece.

Next, description will be made with regard to a method for detecting a position on an edge of a workpiece in a machine tool according to a second embodiment such that the workpiece is held at the machine tool. FIG. 15 illustrates a schematic configuration of a machine tool 200, which detects a position on an edge of the workpiece. As illustrated in FIG. 15, the machine tool 200 includes a carrier 210, a machine body 220, and a tool holder 230. A workpiece W2 is attached to the carrier 210 of the machine tool 200. The carrier 210 carries the workpiece W2 reciprocably in the X axis direction and the Y axis direction. The machine body 220 has an internal configuration similar to the configuration illustrated in FIG. 2. Also, the memory 20 includes shape data of the workpiece W2, instead of the gear data 26. The tool holder 230 is mounted on the machine body 220 movably in the Z axis direction relative to the machine body 220. The contact sensor 150, which includes the contactor 152, is mounted on the tool holder 230. The processor 10 controls the movement of the carrier 210 and the movement of the tool holder 230.

The workpiece W2 has, for example, a planar shape with an aperture 900 formed in the planar shape. The machine tool 200 detects a position in the X axis direction on an edge E4 of the aperture 900 of the workpiece W2. The edge E4 is a boundary between a main surface 902 of the workpiece W2 (surface orthogonal to the Z axis direction) and an inner surface 904 of the aperture 900 (surface orthogonal to the X axis direction). The processor 10 moves the contactor 152 in the Z axis direction while changing the position of the workpiece W2 in the X axis direction by causing the carrier 210 to reciprocate in the X axis direction. In this manner, the processor 10 obtains a determination result. It is also possible, however, to use any other position as the reference position to serve as a basis of the position on the workpiece W2 in the X axis direction. It is also to be noted that the thickness of the workpiece W2 (length in the X axis direction) is included in the workpiece shape data in the memory 20, and that the distance over which the tool holder 230 moves in the Z axis direction is obtained based on the thickness of the workpiece W2.

First, the processor 10 moves the contactor 152 in the Z axis direction toward a first detection position dp1 to obtain a first determination result from the sensor control circuit 30. The first detection position dp1 is an arbitrary position in the X axis direction on the main surface 902 of the workpiece W2. Then, the processor 10 moves the carrier 210 in the X axis direction and moves the contactor 152 in the Z axis direction toward a second detection position dp 2, which is different from the first detection position dp1. In this manner, the processor 10 obtains a second determination result different from the first determination result. The distance over which the workpiece W2 is carried on the carrier 210 corresponds to the distance between the first detection position dp1 and the second detection position dp2 on the workpiece W2. Then, the processor 10 obtains a third detection position between the first detection position dp1 and the second detection position dp2, and moves the carrier 210 in the X axis direction to make the position of the contactor 152 match the third detection position in the X axis direction. Then, the processor 10 moves the contactor 152 in the Z axis direction to obtain a third determination result from the sensor control circuit 30. When the third determination result and the first determination result are identical to each other, the processor 10 replaces the first detection position with the third detection position. When the third determination result and the first determination result are different from each other, the processor 10 replaces the second detection position with the third detection position. Then, the processor 10 calculates anew third detection position to obtain a new third determination result. The processor 10 repeatedly obtains a third determination result until the difference between the first detection position and the second detection position in the X axis direction becomes smaller than a threshold.

When the difference between the first detection position and the second detection position in the X axis direction has become smaller than the threshold, the processor 10 stores, in the memory 20, the first detection position or the second detection position as the position on the edge E4 of the workpiece W2 relative to the machine tool 200. It is to be noted, however, that the position on the edge E4 of the workpiece W2 relative to the machine tool 200 may be any position between the first detection position and the second detection position and may be a middle position between the first detection position and the second detection position.

It is to be noted that FIG. 15 has been provided for exemplary purposes only; it is also possible to obtain the determination results while carrying the workpiece W2 in a reciprocating manner in the Y axis direction. This ensures that a position on an edge of the aperture 900 in the X axis direction is detected.

In this specification, the term "comprise" and its variations are intended to mean open-ended terms, not excluding any other elements and/or components that are not recited herein. The same applies to the terms "include", "have", and their variations.

Also in this specification, a component suffixed with a term such as "member", "portion", "part", "element", "body", and "structure" is intended to mean that there is a single such component or a plurality of such components.

Also in this specification, ordinal terms such as "first" and "second" are merely used for distinguishing purposes and there is no other intention (such as to connote a particular order) in using ordinal terms. For example, the mere use of "first element" does not connote the existence of "second element"; otherwise, the mere use of "second element" does not connote the existence of "first element".

Also in this specification, approximating language such as "approximately", "about", and "substantially" may be applied to modify any quantitative representation that could permissibly vary without a significant change in the final result obtained. All of the quantitative representations recited in this specification shall be construed to be modified by approximating language such as "approximately", "about", and "substantially".

Obviously, numerous modifications and variations of the present invention are possible in light of the above teachings. It is therefore to be understood that within the scope of the appended claims, the present invention may be practiced otherwise than as specifically described herein.

What is claimed is:

1. A method for detecting a phase on a gear, the method comprising:
    obtaining a first determination result indicating whether the gear has been detected at a first detection position, the first detection position being at a first angle relative to a reference position in a circumferential direction of a rotation axis of a spindle holding the gear;
    obtaining a second determination result that indicates whether the gear has been detected at a second detection position and that is different from the first determination result, the second detection position being at a second angle relative to the reference position in the circumferential direction, the second angle being different from the first angle;
    obtaining a third angle that is between the first angle and the second angle;
    obtaining a third determination result indicating whether the gear has been detected at a third detection position that is at the third angle relative to the reference position in the circumferential direction;
    replacing the first angle with the third angle when the third determination result and the first determination result are same, or the second angle with the third angle when the third determination result is different from the first determination result; and
    detecting the phase on the gear in the circumferential direction based on an angle that is between the first angle and the second angle.

2. The method according to claim 1, wherein obtaining the third determination result and replacing are repeated.

3. The method according to claim 2, wherein the phase on the gear is detected when a difference between the first angle and the second angle is smaller than a threshold.

4. The method according to claim 3, wherein a middle angle between the first angle and the second angle is detected as the phase on the gear.

5. The method according to claim 2, wherein a middle angle between the first angle and the second angle is detected as the phase on the gear.

6. The method according to claim 2, wherein the third angle is determined as a middle angle in a middle of the first angle and the second angle.

7. The method according to claim 1, wherein the phase on the gear is detected when a difference between the first angle and the second angle is smaller than a threshold.

8. The method according to claim 7, wherein a middle angle between the first angle and the second angle is detected as the phase on the gear.

9. The method according to claim 1, wherein a middle angle between the first angle and the second angle is detected as the phase on the gear.

10. The method according to claim 1, wherein the third angle is determined as a middle angle in a middle of the first angle and the second angle.

11. The method according to claim 1, further comprising:
    detecting a plurality of phases on the gear; and
    calculating a phase on the gear at a predetermined position on the gear based on the plurality of phases.

12. The method according to claim 1, wherein the second angle is obtained based on a tooth count on the gear.

13. The method according to claim 1,
    wherein the step of obtaining the first determination result comprises
        causing a contactor of a contact sensor and the gear to move relative to each other, and
        determining whether the contactor and the gear contact at the first detection position,
    wherein the step of obtaining the second determination result comprises
        causing the contactor and the gear to move relative to each other, and
        determining whether the contactor and the gear contact at the second detection position, and
    wherein the step of obtaining the third determination result comprises
        causing the contactor and the gear to move relative to each other, and
        determining whether the contactor and the gear contact at the third detection position.

14. The method according to claim 13, wherein each of the steps of determining whether the contactor and the gear have contacted each other comprises
    causing the contactor and the gear to move relative to each other in an axis direction of the rotation axis, and
    determining whether an end surface of the gear and the contactor contact each other, the end surface of the gear being approximately orthogonal to the rotation axis.

15. The method according to claim 13, further comprising:
    causing the contactor and the gear to move relative to each other in a direction approximately orthogonal to the rotation axis; and
    determining whether a tooth end surface of a tooth of the gear and the contactor contact each other, the tooth end surface of the tooth being approximately parallel to the rotation axis.

16. A method for producing a gear, comprising:
    obtaining a first determination result indicating whether the gear has been detected at a first detection position, the first detection position being at a first angle relative to a reference position in a circumferential direction of a rotation axis of a spindle holding the gear;
    obtaining a second determination result that indicates whether the gear has been detected at a second detection position and that is different from the first determination result, the second detection position being at a second angle relative to the reference position in the circumferential direction, the second angle being different from the first angle;
    obtaining a third angle that is between the first angle and the second angle;
    obtaining a third determination result indicating whether the gear has been detected at a third detection position that is at the third angle relative to the reference position in the circumferential direction;
    replacing the first angle with the third angle when the third determination result and the first determination result are same, or the second angle with the third angle when the third determination result is different from the first determination result;

detecting a phase on the gear in the circumferential direction based on an angle that is between the first angle and the second angle; and performing, based on the phase on the gear that has been detected, at least one treatment among finishing on a tooth surface of the gear, burr removal off the gear, copying measurement of the tooth surface, and key hole formation through the gear.

17. A method for detecting a position on an edge of a workpiece, the method comprising:

obtaining a first determination result indicating whether the workpiece has been detected at a first detection position with the workpiece held at a machine tool;

obtaining a second determination result that indicates whether the workpiece has been detected at a second detection position different from the first detection position, the second determination result being different from the first determination result;

obtaining a third detection position that is between the first detection position and the second detection position;

obtaining a third determination result indicating whether the workpiece has been detected at the third detection position;

replacing the first detection position with the third detection position to provide a first replaced detection position when the third determination result and the first determination result are same, or the second detection position with the third detection position to provide a second replaced detection position when the third determination result is different from the first determination result; and detecting, as the position on the edge of the workpiece relative to the machine tool, one position located between the first replaced detection position and the second detection position or located between the first detection position and the second replaced detection position.

18. A machine tool configured to detect a phase on a gear, the machine tool comprising:

a spindle which is configured to hold the gear and which is rotatable about a rotation axis of the spindle;

a sensor control circuit configured to determine whether the gear has been detected at a detection position;

an angle changer configured to change an angle of the detection position relative to a reference position in a circumferential direction of the rotation axis; and a processor configured to obtain a determination result from the sensor control circuit and control the angle changer, the processor being configured to:

obtain a first determination result indicating whether the gear has been detected at a first detection position, the first detection position being at a first angle relative to the reference position in the circumferential direction;

obtain a second determination result that indicates whether the gear has been detected at a second detection position and that is different from the first determination result, the second detection position being at a second angle relative to the reference position in the circumferential direction, the second angle being different from the first angle;

obtain a third angle that is between the first angle and the second angle;

obtain a third determination result indicating whether the gear has been detected at a third detection position that is at the third angle relative to the reference position in the circumferential direction;

replace the first angle with the third angle when the third determination result and the first determination result are same, or the second angle with the third angle when the third determination result is different from the first determination result; and detect the phase on the gear in the circumferential direction based on an angle that is between the first angle and the second angle.

19. The machine tool according to claim 18, further comprising:

an input circuit configured to receive an input of information including a parameter associated with the gear, wherein based on the information input into the input circuit, the processor is configured to determine the first detection position and the second detection position.

20. The machine tool according to claim 18, further comprising:

a display circuit configured to display the detected phase on the gear in the circumferential direction.

* * * * *